March 10, 1936. H. B. KRAUT ET AL 2,033,141
PROTECTIVE MEANS FOR GUIDEWAYS
Filed May 8, 1933
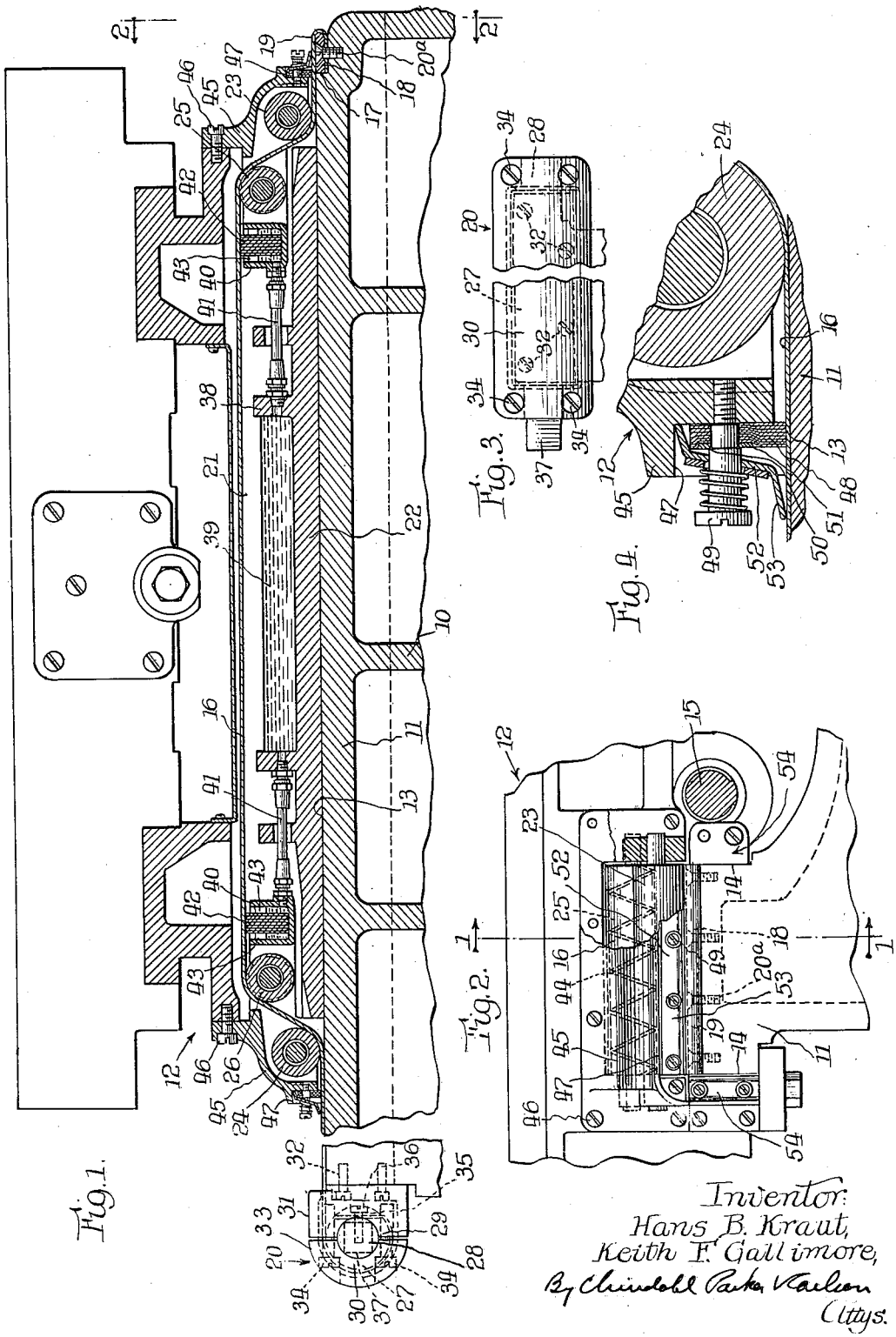
Inventor:
Hans B. Kraut,
Keith F. Gallimore,
By Churchill Parker Carlson
Attys.

Patented Mar. 10, 1936

2,033,141

UNITED STATES PATENT OFFICE 2,033,141

PROTECTIVE MEANS FOR GUIDEWAYS

Hans B. Kraut and Keith F. Gallimore, Fond du Lac, Wis., assignors to Giddings & Lewis Machine Tool Co., Fond du Lac, Wis., a corporation of Wisconsin Application May 8, 1933, Serial No. 669,962

35 Claims. (Cl. 308—5)

The invention relates generally to guard means for protecting guide ways, and the general aim of the invention is to provide novel means for guarding such ways generally, and, in particular the ways in machine tools, against abnormal wear resulting from the deposition of particles of foreign matter on the ways in the operation of the machine.

Guide ways, and especially machine tool ways, are usually finished with great accuracy. In machine operation, foreign matter, such as particles of metal or grit, become mixed with the lubricant on the ways, forming an abradant which causes serious damage to the machine by destroying the accurate finish of the ways.

An object of the invention is to provide a new and improved means for protecting or guarding guide ways embodying a member abutting and sealed to said guide ways on either side of a member, such as a carriage, which is movable along said guide ways.

In conjunction with the foregoing, a further object is to provide means associated with the movable member for progressively displacing the guard means from a fixed normal way-protecting position to form a clearance wherein engagement between the guide way and movable member occurs.

An additional object is to provide the aforesaid clearance by displacing the fixed guard means progressively at the advancing side of the movable member and returning said means to its normal position at the following side of said member.

More specifically stated, an object is to provide, in a machine having a carriage or the like movable along a guide way, guard means for the way in the form of a flexible member of greater length than that of the way and permanently fixed to contact an exposed bearing face of said way, means movable with said carriage and engaging said flexible member to form a loop of the slack therein extending across the area of engagement between said carriage and way, and adjustable means for tensioning said flexible member to hold it taut throughout its length.

A further object is to provide novel means for protecting a guide way which utilizes a fluid seal between said way and a guard member.

Another object of the invention is to provide improved means for lubricating the guide way.

Stated more specifically, an object is to provide a flexible guard member capable of being progressively displaced from and returned to an abutting contact with a guide way in the movement of a carriage relative to said way, and means for applying a lubricant to the way-abutting side of said member while it is so displaced whereby, upon return of said member into contact, the lubricant forms a fluid seal between the member and way and is also transferred in part to the way for lubrication thereof.

Another object is to provide means on the carriage for removing foreign matter from the outer face of the guard member.

Other objects and advantages will become apparent in the following description and from the accompanying drawing, in which:

Figure 1 is a fragmentary longitudinal sectional view through a machine embodying the features of the invention, the line of section being indicated at 1—1 in Fig. 2.

Fig. 2 is a fragmentary end elevation looking toward the right-hand end of the machine as indicated by the arrows 2—2 (Fig. 1), the end wall of the carriage being partially broken away.

Fig. 3 is a fragmentary side elevation of the tensioning means for the way guard as shown at the left-hand end (Fig. 1) of the machine.

Fig. 4 is an enlarged transverse section of one end of the carriage in illustration of a detail of construction.

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

The invention will be described, for purposes of illustration, in a machine tool environment. Such tools conventionally have a horizontal stationary bed 10 having on its upper surface a longitudinally extending guide way 11 of conventional form for cooperation with a movable carriage 12. In this particular instance, the way is generally of rectangular cross-section, providing a flat horizontal upper surface 13 and vertical side surfaces 14. Since these surfaces are bearing faces, they are usually finished with great accuracy. The under face of the carriage has a complementarily-shaped groove for engagement with the way, said groove also being accurately finished to prevent relative lateral movement other than the sliding travel of the carriage along the way. Such conventional driving means as a screw 15 (Fig. 2) may be employed to reciprocate the carriage.

The means for guarding the guide way possesses several characteristics each cooperating to afford the ultimate in protection to the way. Thus, the guard on either side of the carriage or equivalent movable member, is always in close contact with a bearing surface of the way, the effectiveness of this contact in preventing the entrance of foreign matter preferably being amplified by forming a fluid seal between the guard and bearing surface. The guard, as a whole, is fixed with respect to the bed and way so that its protecting position relative to the way is positively assured. In order that the carriage may move along the way, the guard is capable of being temporarily displaced from the way progressively in accordance with carriage movement. Or, stating this characteristic more particularly, the guard is so fashioned and mounted that the movement of the carriage is effective, at the advancing side of the carriage, to displace the guard progressively, and, at the trailing side of the carriage, to replace the guard in its protecting relation to the way. While the guard is displaced, the fluid which produces the tight seal between the guard and way is renewed or replenished. A lubricating oil forms an effective seal and its use is highly desirable since the way is automatically oiled by the transfer of oil from the guard to the way.

In the illustrated embodiment, the way guard is designated 16 and comprises an elongated strip of flexible material, preferably thin-gauge spring steel. At one end of the way is a transverse recess 17 (Fig. 1) fashioned to receive a thin bar 18 about which an end 19 of the guard 16 is passed, the bar being then secured to the base as by screws 20ᵃ to fix the end of the guard to the bed in position to extend along the way in abutting contact therewith.

The guard extends the entire length of the way and is secured in place at the opposite end of the way by suitable tensioning means 20 to be presently described. The guard, however, is longer than the way so that the desired clearance in which the carriage engages the way may be produced by forming a loop of the slack. For this purpose the following arrangement of parts is preferred. The carriage is generally of conventional construction and has an internal compartment 21 extending longitudinally thereof immediately within the way engaging part 22 of the carriage. At the ends of the carriage are transversely extending guide means, such as rolls 23, 24 journaled on the carriage and disposed closely adjacent to the bearing surface of the way over which the guard extends. These rolls 23, 24 engage the outer or exposed surface of the guard and are arranged to hold the guard in close contact with the way.

Intermediate the rolls 23, 24 and spaced upwardly from the way are other guide means or rolls 25, 26 for engagement with the under or way-contacting surface of the guard. Thus, a loop is formed in the guard by passing the guard under the end rolls 23, 24 and over the intermediate rolls 25, 26 which permits the guiding engagement between the carriage and way to be effective for substantially the full length of the carriage. While the four rolls are herein shown as being located at the corners of a quadrilateral, it may be possible, where the carriage construction permits, to eliminate one of the intermediate rolls 25, 26 and position the remaining roll more centrally without affecting operation of the mechanism.

The guard is maintained taut by the tensioning means 20 which secures one end of the guard to the bed. The simple, preferred structure of the means 20 may be best seen in Fig. 3. A cylinder 27 having journals 28 is supported at one end of the bed (herein the left-hand end as viewed in Fig. 1) in alinement with the way by divided or split bearings, the sections of which are designated 29 and 30 (Fig. 1). The section 29 of each bearing is carried in a bracket 31 rigidly affixed to the bed, as by screws 32, said bracket between the bearing sections being dished to receive the cylinder 27. A slot in the bracket alined with the way allows the guard to be passed into contact with the cylinder.

The remaining sections 30 of said bearings are formed in a cover element 33 which is the complement of the bracket 31 and is detachably secured thereto as by screws 34. The cylinder 27 is longitudinally divided, preferably along a chord, to provide a detachable section 35 (Fig. 1) which may be secured to the main body of the cylinder by screws 36 to clamp the end of the guard between the section 35 and the cylinder body. A squared extension 37 on one journal 28 facilitates engagement by a suitable tool for rotating the cylinder after the guard is secured thereto whereby the guard may be placed under proper operating tension. For holding the guard taut, the screws 34 may be used to draw the bearing sections together and into a firm non-rotative engagement with the journals.

The means by which lubricating oil is applied to the under side of the guard is preferably housed within the compartment 21 in the carriage. Thus, the part 22 supports a main reservoir 38 for a body of sealing fluid or oil 39. At each end of said reservoir and preferably located adjacent to the corresponding roll 25 or 26 is a transversely extending feed reservoir 40 connected by a duct 41 with the main reservoir. Each feed reservoir has a wick 42 of felt or the like therein which is spaced from the walls of the feed reservoir by positioning lugs 43 and is arranged to wipe the under side of the guard as it passes to or from the adjoining roll 25 or 26. By this arrangement, a film of the fluid or oil is constantly being transferred to the under side of the guard as the carriage moves. To insure that the film will be evenly distributed across the guard, it has been found satisfactory to form a spiral groove 44 (Fig. 2) in each roll 25, 26.

The ends of the carriage are, in this instance, open, and closure plates 45 are detachably secured to the ends of the carriage by screws 46, these plates being of arcuate cross-section to fit over and around the outer portion of the end rolls 23, 24. The plates depend nearly to the way guard and support means for cleaning the outer surface of the guard in the movement of the carriage. As shown in Fig. 4, each plate has an outwardly facing transverse recess 47 therein in which an upright wiper 48 of felt, or similar material, is supported by a series of screws 49 engaged with the plate. The screws have shoulders 50 engaging washers 51 or the like securely to hold the wiper in place. An angular plate 52 extending transversely of the guard is formed, as shown, to bear at one end against the corner of said recess, is apertured to allow the screws to extend therethrough, and has an outwardly extending lip 53 fashioned to ride on the outer face of the guard. Springs 54 bearing against heads on the screws 49 and loose washers 50 abutting the plate 52 exert a force urging the lip against the guard. Hence, as the carriage reciprocates, the lips 53 and wipers 48 clean the upper surface of the guard thoroughly before the guard enters the carriage. If desired the wiper and lip construction may be extended (as shown at 54, Fig. 2) along a vertical bearing face 14 of the way.

In the operation of the machine, the carriage is reciprocated along the way in which movement the pair of rolls at the advancing end of the carriage displace the way guard from the way within the carriage. At the trailing end and also within the carriage, the opposite pair of rolls replaces the guard in protecting position. Meanwhile the sealing and lubricating film of oil has been applied to the guard so that the fluid seal between the way and guard is renewed and the way again lubricated. All of these factors contribute in making the present invention one which is exceedingly efficient in preventing damage or injury to the guide way by the eliminating of any possibility of deposition of foreign matter on the way.

We claim as our invention:

1. In a machine having guide means and a movable member guided thereby, guard means for said guide means extending along and normally in contact with said guide means and movable into spaced relation thereto substantially throughout the position occupied by said movable member.

2. In a machine of the character described, the combination of a guide way, a carriage movable along said way, and guard means for a bearing face of said way comprising a member fixed at opposite ends to said bed and maintained in sealed contact with said way on both sides of said carriage.

3. In a machine having guide means and a movable member engaging said guide means, protecting means occupying a substantially fixed position relative to a face of said guide means, and means on said movable member for spacing a portion of said protecting means from said guide means throughout the area occupied by said movable member according to the movement thereof along said guide means.

4. In a machine of the character described having guide means and a member movable relatively thereto, protecting means fixed with respect to said guide means and normally extending closely adjacent thereto, and means for moving said protecting means away from its normal position on one side of said movable member and for returning it to said normal position on the other side of said movable member as said member traverses said guide means to provide clearance for the guiding engagement of said movable member with said guide means.

5. In a machine of the character described, fixed guide means, a carriage movable along said guide means, a guard element for said guide means comprising a flexible member extending adjacent to said guide means in a position to prevent a deposition of foreign matter on said guide means, and means for progressively flexing said member away from said guide means as said carriage moves to provide a clearance wherein said carriage may engage said guide means.

6. In a machine of the character described, fixed guide means, a carriage movable along said guide means, a guard element for said guide means comprising a member extending along and abutting said guide means to permit a fluid seal to be formed therebetween, means for displacing said member throughout the area occupied by said carriage as said carriage moves, and means for supplying fluid to produce the seal between said member and guide means.

7. A machine having, in combination with a movable member and guide means therefor, flexible guard means for said guide means, means movable with said member and engaging said guard means progressively to form a loop therein about the position occupied by said movable member, and means for maintaining said guard means under tension.

8. A machine having, in combination with a movable carriage and guide means engaged by said carriage, flexible guard means of greater length than said guide means and fixed to extend in closely overlying relation to a bearing face of said guide means, and means on said carriage engaging said guard means to take up the slack and including means near each end of the carriage for holding said guard means close to said guide means.

9. A machine having, in combination with a way and a member movable in guided engagement with said way, flexible guard means fixed to extend along an exposed face of said way, means on said carriage engaging said guard means to form a loop therein dimensioned to provide a clearance for the engagement of said way by said carriage, and means for applying a film of sealing fluid to the under side of said guard.

10. A machine having, in combination with a bed including a way and a carriage movably mounted on said bed in guided engagement with said way, flexible guard means fixed with respect to said bed and way to extend along the exposed face of said way, guide rolls on said carriage disposed adjacent to said way for engagement with said guard means near either end of the carriage and under which said guard means passes, other guide rolls on said carriage spaced from said ways and over which said guard means passes, said guide rolls cooperating to form a loop in said guard means having a lengthwise dimension substantially coextensive with that of the carriage.

11. A machine having, in combination with a bed including a way and a carriage movably mounted on said bed in guided engagement with said way, flexible guard means fixed with respect to said bed and way to extend in closely overlying relation to the exposed face of said way, guide rolls on said carriage disposed adjacent to said way for engagement with said guard means near either end of the carriage and under which said guard means passes, other guide rolls on said carriage spaced from said ways and over which said guard means passes, said guide rolls cooperating to form a loop in said guard means exposing said way for engagement by said carriage, and means for applying a lubricant to the way-engaging face in the looped portion of said guard means.

12. A machine having, in combination with a way and a carriage movably mounted in guided engagement with said way, flexible guard means fixed with respect to said way to extend in closely overlying relation to an exposed face thereof, guide means on said carriage for said flexible guard means, one element of said guide means being located near each end of the carriage and closely adjacent to the way for pressing said guard means into contact with said way, another element of said guide means being intermediately positioned in spaced relation to the way and over which said guard means passes to form a loop therein within the carriage, means for applying a film of oil to the under side of said guard means whereby said guard means has an oil-sealed and oil-transferring engagement with said way, and means for maintaining said guard means taut.

13. In a machine having a bed, a carriage, and a way on said bed for guiding carriage movement; a flexible way-guard fixed with respect to said bed to extend along and in abutment with said way, said guard being longer than said way; guide rolls in said carriage arranged generally at the four corners of a quadrilateral with a roll disposed near each end of the carriage closely adjacent to the way, and the other rolls spaced from said way; said way-guard being passed under the rolls at the ends of the carriage, whereby these rolls press the way-guard closely against the way, and over the rolls which are spaced from the way to form a loop of the slack in said way-guard, thereby providing a clearance between the way and way-guard wherein the carriage engages the way; and means for holding the way-guard taut.

14. In a machine having a movable member and a guide therefor, guard means for said guide, and means for displacing and replacing said guard means respectively at the advancing and trailing sides of said member.

15. In a machine having a movable member and a guide therefor, and guard means for said guide extending longitudinally of said guide from opposite sides of said member and releasably sealed to said guide.

16. In a machine having a movable member and a guide therefor, flexible guard means fixed with respect to and in contact with said guide on each side of said member.

17. In a machine having a movable member and a guide therefore, guard means of thin gauge spring steel fixed to contact said guide, and means for displacing said guard from such position by movement of said member.

18. A machine having, in combination with guide means and a movable carriage guided thereby, a guard for said guide means fixed with respect to said guide means and passing through said carriage, and means on said carriage engaging the outer surface of said guard means for removing foreign matter before said guard means enters said carriage.

19. A machine having, in combination, guide means, guard means fixed with respect to and in contact with said guide means, a carriage movable along said guide means and relative to said guard means, and means for removing foreign matter from the outer surface of said guard means.

20. A machine having, in combination, guide means, guard means fixed with respect to and in contact with said guide means, a carriage movable along said guide means and relative to said guard means, said carriage having a passageway therein through which said guard means extends, and means at each end of said carriage having a wiping engagement with the outer surface of said guard means.

21. A machine having, in combination, guide means, guard means fixed with respect to and in contact with said guide means, a carriage movable along said guide means and relative to said guard means, said carriage having a passageway therein through which said guard means extends, and a cleaning device for said guard means at each end of the carriage having spring urged contact with the outer surface of said guard means.

22. A machine having, in combination, guide means, guard means fixed with respect to and in contact with said guide means, a carriage movable along said guide means and relative to said guard means, said carriage having a passageway therein through which said guard means extends, means engaging said guard means in said passageway for moving said guard means into spaced relationship with said guide means, an oil reservoir, and means for applying oil from said reservoir to the under side of a spaced part of said guard means.

23. In combination, two relatively reciprocable elements having engaging guide faces, the face on one element being elongated as compared with the corresponding guide face dimension of the other element, and means for protecting the elongated guide face comprising guard means having its ends fixed relative to the elongated guide face and extending in overlying contact therewith.

24. In combination, two relatively reciprocable elements having engaging guide faces, the face on one element being elongated as compared with the corresponding guide face dimension of the other element, means for protecting the elongated guide face comprising flexible guard means secured near each end of the elongated guide face to extend in contact therewith, and means on the element having the shorter guide face for displacing said guard means out of said contact as said elements move relatively in one direction and for replacing said guard means in contact as relative movement occurs in the opposite direction.

25. In combination, two relatively reciprocable elements having coacting guide faces, the face on one element being substantially longer than that on the other element, and means for protecting the longer guide face comprising a flexible guard extending along said longer guide face in closely overlying relation thereto and having its opposite ends fixed relative to said longer guide face, said guard passing through the opposing element and being maintained under tension, and means carried by said opposing element acting to maintain the portions of said guard extending from opposite sides of said opposing element in closely overlying relation to said longer guide face and also acting progressively in the relative reciprocation of said elements to space an intermediate portion of said guard from said longer guide face to permit the interengagement of the guide faces of said elements.

26. In combination, two relatively reciprocable elements having coacting guide faces, the face on one element being substantially longer than that on the other element, and means for protecting the longer guide face comprising a flexible guard extending along said longer guide face in closely overlying relation thereto, and means carried by said opposing element acting to maintain a portion of said guard in said closely overlying relation to said longer guide face and also acting in the relative reciprocation of said elements to progressively flex a portion of said guard into spaced relation to said longer face to permit the interengagement of the respective guide faces of said elements.

27. In combination, two relatively reciprocable elements having coacting guide faces, the face on one element being substantially longer than that on the other element, and means for protecting the longer guide face comprising a guard extending along said longer guide face in protective relation thereto, and means acting in the relative reciprocation of said elements to shift a portion of said guard into spaced relation to said longer guide face to permit the interengagement of the respective guide faces of said elements.

28. In combination, a guide way, a protective guard therefor in closely overlying relation to said guide way, and means for progressively shifting portions of said guard away from said guide way to accommodate the position of an element which coacts with said guide way.

29. A combined way guard and lubricator comprising an elongated guard element longitudinally fixed relative to the way, and means for oiling one face of said guard element and for pressing the oiled face against the way.

30. In a machine having a carriage, and a way for guiding carriage movement; a flexible way-guard extending along and in contact with said way; said guard being longer than said way; guides for said guard carried by said carriage and so arranged that a guide is disposed near each end of the carriage closely adjacent to the way and under which said guard passes, and an intermediate guide is spaced from said way and over which said guard passes thereby to displace said guard from the way substantially throughout the position occupied by the carriage.

31. A machine having, in combination, guide means, guard means fixed with respect to and in contact with said guide means, a carriage movable along said guide means and relative to said guard means, said carriage having a passageway therein through which said guard means extends, means engaging said guard means in said passageway for moving said guard means into spaced and substantially parallel relationship with said guide means for a distance approximately equal to the length of said carriage, an oil supply reservoir on said carriage, means connected with said reservoir for transferring oil to the under side of said guard means, and means for evenly distributing the oil on said guard means.

32. In a machine having a movable member and a guide therefor, flexible guard means fixed to contact said guide, means for flexing said guard from such position by movement of said member, and means for maintaining said flexible guard means taut.

33. In combination, two relatively reciprocable elements having coacting guide faces, the face on one element being substantially longer than that on the other element, and means for protecting the longer guide face comprising a flexible guard extending along said longer guide face in protective relation thereto, means acting in the relative reciprocation of said elements to flex a portion of said guard into spaced relation to said longer guide face to permit the interengagement of the respective guide faces of said elements, and means for maintaining said flexible guard in a taut condition whereby to assure the protective relationship of the guard and longer guide face.

34. In a machine having a movable member and a way for guiding movements of said movable member, the combination of means extending along said way beyond the sides of said movable member and contacting substantially the length of the way beyond said movable member in all positions of said movable member, and means for applying lubricant to the extending means for transfer therefrom to said way.

35. In a machine having a movable member and a guide therefor, guard means for said guide disposed to extend in contact with said guide from opposite sides of said movable member and in longitudinally fixed protective relation to the exposed face of said guide, and means for introducing lubricant between the contacting faces of said guide and guard means to lubricate said guide and provide a fluid seal between said contacting guide and guard means.

HANS B. KRAUT.
KEITH F. GALLIMORE.